United States Patent
Ebato et al.

(10) Patent No.: US 8,260,090 B2
(45) Date of Patent: Sep. 4, 2012

(54) INFORMATION PROCESSING APPARATUS, IMAGING APPARATUS, IMAGE DISPLAY CONTROL METHOD AND COMPUTER PROGRAM

(75) Inventors: Satoshi Ebato, Tokyo (JP); Kenji Yoshida, Kanagawa (JP); Tatsuhito Tabuchi, Tokyo (JP); Kou Kobayashi, Tokyo (JP); Yoshihito Okizaki, Tokyo (JP); Shigeru Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 12/035,831

(22) Filed: Feb. 22, 2008

(65) Prior Publication Data

US 2008/0226198 A1 Sep. 18, 2008

(30) Foreign Application Priority Data

Mar. 15, 2007 (JP) ................................. 2007-066170

(51) Int. Cl.
*G06K 9/54* (2006.01)
*H04N 5/222* (2006.01)

(52) U.S. Cl. .................................. 382/305; 348/333.05

(58) Field of Classification Search .................. 382/189, 382/232, 305, 312; 345/418, 530, 670; 358/528, 358/539; 348/207.99, 333.05
See application file for complete search history.

(56) References Cited

U.S. PATENT DOCUMENTS

| | | | |
|---|---|---|---|
| 4,991,121 A * | 2/1991 | Minoura et al. ............... | 345/1.1 |
| 5,966,122 A | 10/1999 | Itoh | |
| 6,424,429 B1 * | 7/2002 | Takahashi et al. ........... | 358/1.16 |
| 6,452,615 B1 | 9/2002 | Chiu et al. | |
| 6,546,188 B1 | 4/2003 | Ishii et al. | |
| 6,747,674 B1 * | 6/2004 | Asami .............................. | 715/721 |
| 7,020,381 B1 * | 3/2006 | Kato et al. .................... | 386/280 |
| 7,185,283 B1 | 2/2007 | Takahashi | |
| 7,280,753 B2 * | 10/2007 | Oya et al. ........................ | 396/429 |
| 7,483,625 B2 * | 1/2009 | Tsujii et al. .................... | 386/328 |
| 2001/0014203 A1 | 8/2001 | Ito et al. | |
| 2002/0171682 A1 | 11/2002 | Frank et al. | |
| 2002/0197060 A1 | 12/2002 | Itoh et al. | |
| 2005/0046699 A1 | 3/2005 | Oya et al. | |
| 2005/0216840 A1 | 9/2005 | Salvucci | |

(Continued)

FOREIGN PATENT DOCUMENTS

CN 1206987 A 2/1999

(Continued)

OTHER PUBLICATIONS

"PMB (Picture Motion Browser) Support", Sony, Decorating videos and photos to upload to network media services (eDeco), Ver. 5.0, 2010, 8 pages with English translation.

(Continued)

*Primary Examiner* — Kanjibhai Patel
(74) *Attorney, Agent, or Firm* — Oblon, Spivak, McClelland, Maier & Neustadt, L.L.P.

(57) ABSTRACT

An apparatus for processing an image includes an input unit for inputting user operation information, a recording medium for recording moving image data, a data processor for retrieving data recorded on the recording medium and generating display data in response to an input to the input unit, and a display unit for displaying the display data. The data processor generates a contracted image of an image selected at predetermined time intervals from a scene as a moving image recording unit recorded on the recording medium and displays on the display unit a list of generated contracted images arranged in a time-series order.

37 Claims, 8 Drawing Sheets

U.S. PATENT DOCUMENTS

| | | |
|---|---|---|
| 2005/0225644 A1 | 10/2005 | Shibuya et al. |
| 2007/0019932 A1 | 1/2007 | King et al. |
| 2007/0035652 A1 | 2/2007 | Toyoda et al. |

FOREIGN PATENT DOCUMENTS

| | | |
|---|---|---|
| CN | 1233822 A | 11/1999 |
| CN | 1411275 A | 4/2003 |
| CN | 1553706 A | 12/2004 |
| CN | 1916830 | 2/2007 |
| JP | 11-284948 | 10/1999 |
| JP | 11-313316 | 11/1999 |
| JP | 2003-289494 | 10/2003 |
| JP | 2005-260749 | 9/2005 |
| JP | 2006-166193 | 6/2006 |
| TW | 200536389 | 11/2005 |
| TW | I250796 | 3/2006 |
| TW | I259719 | 8/2006 |
| WO | WO 01/99403 A2 | 12/2001 |
| WO | WO 2006/064358 A1 | 6/2006 |

OTHER PUBLICATIONS

U.S. Appl. No. 12/043,366, filed March 6, 2008, Ebato, et al.
Extended European Search Report issued Jul. 11, 2011, in Patent Application No. 08152652.7.
Office Action issued Aug. 2, 2011 in Japan Application No. 2007-066170.
Taiwan Office Action issued on Aug. 16, 2011 in Patent Application No. 097105603 with partial English translation.
Japanese Office Action dated Oct. 18, 2011 in Patent Application No. 2007-066170.
Japanese Office Action mailed on Apr. 24, 2012 in the counterpart Japanese application 2007-066170 filed on Mar. 15, 2007.

* cited by examiner

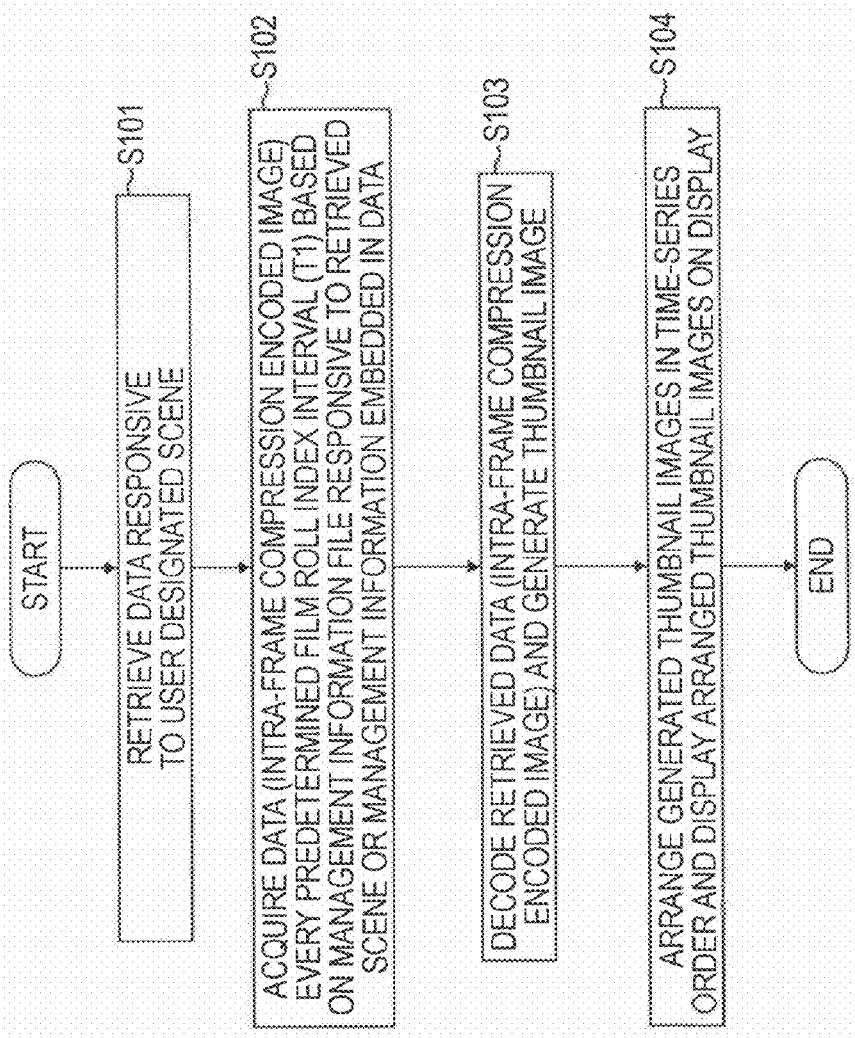

INFORMATION PROCESSING APPARATUS, IMAGING APPARATUS, IMAGE DISPLAY CONTROL METHOD AND COMPUTER PROGRAM

CROSS REFERENCES TO RELATED APPLICATIONS

The present invention contains subject matter related to Japanese Patent Application JP 2007-066170 filed in the Japanese Patent Office on Mar. 15, 2007, the entire contents of which are incorporated herein by reference.

BACKGROUND OF THE INVENTION

1. Field of the Invention

The present invention relates to an information processing apparatus, an imaging apparatus, an image display control method and a computer program. More particularly, the present invention relates to an information processing apparatus, an imaging apparatus, an image display control method and a computer program for displaying, in a list of thumbnail images, images selected from a great deal of moving image data picked up by a video camera, for example, and starting a moving image playing process at a position of a thumbnail image designated by a user on the thumbnail image from the thumbnail image list.

2. Description of the Related Art

Many of imaging apparatuses such as a digital camera and a digital video camera and image processing apparatuses such as a digital versatile disk (DVD) player have a function of displaying on a video display unit or a monitor screen a list of image data stored on a recording medium.

For example, an apparatus playing a moving image, such as an imaging apparatus or a DVD player, displays titles of moving images and chapters in a menu form and allows a user to select a play content from display data for playing. For example, an imaging apparatus picks up a moving image and captures, as one scene, moving image data in one cycle of capturing (photographing) process, namely, from a start of a capturing operation of the scene to an end of the capturing operation of the scene and displays a reduced image (thumbnail image) of a representative image selected from each scene. The imaging apparatus displays a list of thumbnail images of a plurality of scenes (moving image data) recorded on a recording medium. The scene is also referred to as a cut.

For example, Japanese Laid Open Patent Publication No. Hei. 10-028250 discloses a technique of displaying a contracted image (thumbnail image) of a representative image selected from each scene.

Since a monitor displays the contracted image (thumbnail image) of image data forming each image data file stored on the recording medium, a user learns captured image data to some degree.

A single thumbnail image is displayed on a per scene basis in the list of thumbnail images displayed on a digital versatile disk (DVD) player or a video camera in the related art. More specifically, the moving image data from the start of the image capturing operation to the end of the image capturing operation is handled as one scene. A representative image is selected from one scene. For example, a head image of one scene is selected and a thumbnail image of the selected image is then displayed.

A variety of moving image data (scenes) is recorded on the recording medium. The moving image data changes in time length from scene to scene, for example a short scene may be several seconds long and a long scene may be one hour long, for example. It may be sometimes difficult to determine what is photographed in a scene. When a list of thumbnail images is displayed, a still image of the head image of each scene is selected, and displayed in a contracted size. It may be often difficult for a user to learn the content of the image data from the head image. The displaying of the head image alone does not necessarily allow the user to learn what the moving image presents.

When a play scene is selected from the thumbnail image list, the selected scene is played from the beginning thereof. A portion of the scene the user is really interested in may typically appear in the middle of the scene rather than in the beginning of the scene. In such a case, the user starts playing, then performs a fast-forward operation and searches a data position of interest by continuously watching a play screen or a fast-forward screen.

Japanese Laid Open Patent Publication No. Hei 06-153157 discloses a technique that allows an image to be searched with index images extracted in time-series order being displayed. This technique requires that an index generation process be performed beforehand. Images are acquired at regular intervals from image data recorded on a recording medium in order to generate an index image. The generated index image is then recorded on the recording medium again. Generating the index image takes time. The generated index image recorded on the recording medium reduces a memory capacity available on the recording medium.

SUMMARY OF THE INVENTION

It is thus desirable to provide an information processing apparatus, an imaging apparatus, an image display control method and a computer program for displaying time-series thumbnail images of a plurality of time-series images of each scene recorded on a recording unit so that the playing of the scene is started with any of the thumbnail images displayed.

In accordance with one embodiment of the present invention, an apparatus for processing an image, includes an input unit for inputting user operation information, a recording medium for recording moving image data, a data processor for retrieving data recorded on the recording medium and generating display data in response to an input to the input unit, and a display unit for displaying the display data generated and output by the data processor. The data processor generating a contracted image of an image selected at predetermined time intervals from a scene as a moving image recording unit recorded on the recording medium and displaying on the display unit a list of generated contracted images arranged in a time-series order.

The data processor may select, as source data of the contracted image to be displayed on the time-series contracted image list, an intra-frame encoded image present in the vicinity of a node of the predetermined time intervals and generate the contracted image.

The data processor may acquire position information of an intra-frame encoded image within the scene from a video signal management file recorded on the recording medium, selects the intra-frame encoded image present in the vicinity of a node of the predetermined time intervals and generate the contracted image.

The data processor may acquire position information of an intra-frame encoded image by analyzing management information in a video signal stream of the scene recorded on the recording medium, select the intra-frame encoded image present in the vicinity of a node of the predetermined time intervals and generate the contracted image.

The input unit may include a touchpanel on the display unit, and the data processor may input contracted image designation information from a user designating a contracted image on the time-series contracted image list displayed on the display unit and play the image from an image position corresponding to the designated contracted image.

The data processor may switch between a time-series contracted image list screen displayed on the display unit and a scene index screen, displayed on the display unit, containing the contracted image as a representative image of each of a plurality of scenes stored on the recording medium, in response to user operation information entered via the input unit.

The data processor may switch between a time-series contracted image list screen displayed on the display unit and a scene index screen, displayed on the display unit, containing the contracted image as a representative image of each of a plurality of scenes stored on the recording medium, in response to single-action user operation information entered via the input unit.

In accordance with one embodiment of the present invention, an imaging apparatus, includes an imaging unit for picking up an image, an input unit for inputting user operation information, a recording medium for recording moving image data, a data processor for retrieving data recorded on the recording medium and generating display data in response to an input to the input unit, and a display unit for displaying the display data generated and output by the data processor. The data processor generates a contracted image of an image selected at predetermined time intervals from a scene as a moving image recording unit recorded on the recording medium and displays on the display unit a list of generated contracted images arranged in a time-series order.

In accordance with one embodiment of the present invention, a method of an image processing apparatus for controlling image displaying, includes steps of inputting user operation information to an input unit, processing data by retrieving data recorded on a recording medium and generating display data in response to an input to the input unit, and displaying the generated display data on a display unit. The step of processing data includes generating a contracted image of an image selected at predetermined time intervals from a scene as a moving image recording unit recorded on the recording medium and displaying on the display unit a list of generated contracted images arranged in a time-series order.

The step of processing data may include selecting, as source data of the contracted image to be displayed on the time-series contracted image list, an intra-frame encoded image present in the vicinity of a node of the predetermined time intervals and generating the contracted image.

The step of processing data may include acquiring position information of an intra-frame encoded image within the scene from a video signal management file recorded on the recording medium, selects the intra-frame encoded image present in the vicinity of a node of the predetermined time intervals and generating the contracted image.

The step of processing data may include acquiring position information of an intra-frame encoded image by analyzing management information in a video signal stream of the scene recorded on the recording medium, selects the intra-frame encoded image present in the vicinity of a node of the predetermined time intervals and generating the contracted image.

The input unit may include a touchpanel on the display unit, and the step of processing data may include inputting contracted image designation information from a user designating a contracted image on the time-series contracted image list displayed on the display unit and playing the image from an image position corresponding to the designated contracted image.

The step of processing data may include switching between a time-series contracted image list screen displayed on the display unit and a scene index screen, displayed on the display unit, containing the contracted image as a representative image of each of a plurality of scenes stored on the recording medium, in response to user operation information entered via the input unit.

The step of processing data may include switching between a time-series contracted image list screen displayed on the display unit and a scene index screen, displayed on the display unit, containing the contracted image as a representative image of each of a plurality of scenes stored on the recording medium, in response to single-action user operation information entered via the input unit.

In accordance with one embodiment of the present invention, a computer program for causing an image processing apparatus to control image displaying, includes steps of processing data by retrieving data recorded on a recording medium and generating display data in response to an input to the input unit, and displaying the generated display data. The step of processing data includes generating a contracted image of an image selected at predetermined time intervals from a scene as a moving image recording unit recorded on the recording medium and displaying on the display unit a list of generated contracted images arranged in a time-series order.

A computer program in accordance with one embodiment of the present invention may be supplied in a computer readable form to a recording medium in a general-purpose computer system performing a variety of program code. The computer system thus performs a process responsive to the computer program with the computer program supplied in a computer readable form.

These and other objects, features and advantages of the present invention will become apparent from the following description of the embodiments of the present invention with reference to the accompanying drawings. The term system in this specification refers to a logical set of a plurality of apparatuses and elements of each apparatus are not necessarily housed in the same casing.

In accordance with embodiments of the present invention, time-series thumbnail image data (film roll index) of each scene set as moving image recording unit is generated and displayed on the display unit. The user can easily learn the content of each scene based on the time-series thumbnail image. By designating a time-series thumbnail image, the user can start immediately playing images with the image frame. The user can thus immediately play a scene the user wants to play. By switching between a scene index screen and a film roll index screen in response to the user's single action, the user can enjoy a variety of display modes.

BRIEF DESCRIPTION OF THE DRAWINGS

FIG. 8 is a flowchart illustrating a generation process of the thumbnail image displayed on the film roll index screen.

DESCRIPTION OF THE PREFERRED EMBODIMENTS

An information processing apparatus, an imaging apparatus, an image display control method and a computer program in accordance with embodiments of the present invention are described below in detail with reference to the drawings.

Figure 1:
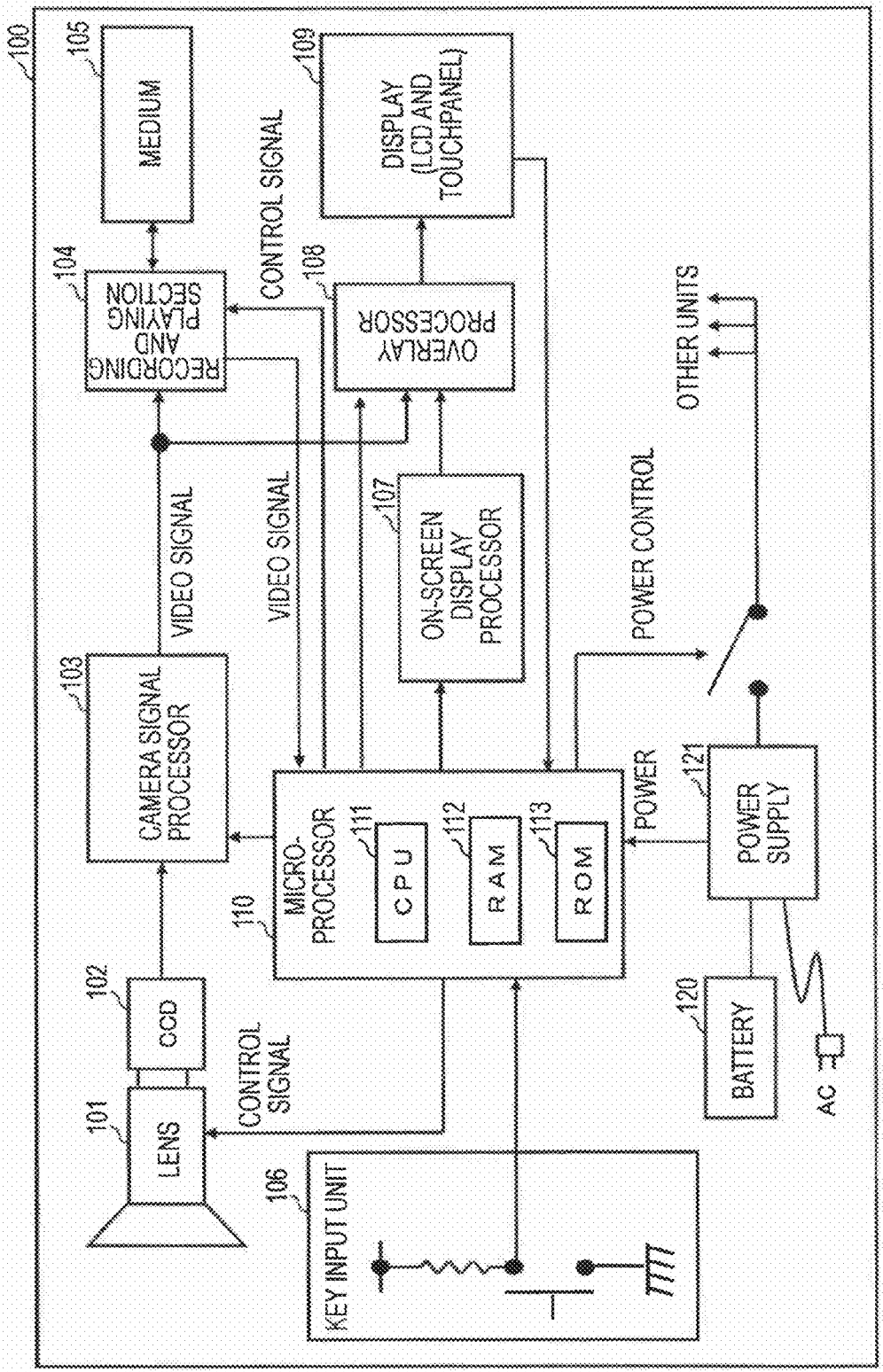
FIG. 1 illustrates an imaging apparatus as an example of image processing apparatus in accordance with one embodiment of the present invention.

An imaging apparatus 100 as one example of information processing apparatus is described below with reference to a block diagram of FIG. 1. When an image capturing start signal is input to a microprocessor 110 from a key input unit 106 as a user operation unit, the microprocessor 110 starts an image capturing process by outputting control signals to related elements. A focus mechanism, a shutter mechanism and an aperture stop mechanism all in a lens unit 101, controlled by the microprocessor 110, capture an image of a subject and supply the image onto a charge-coupled device (CCD) 102.

The CCD 102 photoelectrically converts the image into the image of the subject in the form of an electrical signal (image signal) and outputs the image signal to a camera signal processor 103. The camera signal processor 103 processes the image signal. For example, the camera signal processor 103 performs on the image signal a correlated double sampling (CDS) process, an automatic gain control (AGC) process, an analog-to-digital (A/D) conversion process, an auto focus (AF) process, an auto exposure (AE) process, an auto white balance (AWB) process, etc. Image data having undergone a variety of adjustments is output to a recording and playing section 104 and a display 109. A photographed image is displayed as a through image on the display 109. The recording and playing section 104 compresses data in accordance with a predetermined compression method and records the resulting compressed data onto the recording medium 105. Recording methods of the recording medium include a high-definition (HD) video recording method with data compressed in accordance with moving picture experts group (MPEG)-4 AVC/H. 264 or standard-definition (SD) video recording method with data compressed in accordance with MPEG-2.

The microprocessor 110 receives key operation information from the key input unit 106 and user operation information responsive to a key operation on the display 109. The microprocessor 110 performs a process responsive to the user instruction. The display 109 includes a liquid-crystal display (LCD) touchpanel and displays the GUI which is ready to receive user operation information. Keys on the key input unit 106 are referred as "hard keys" and operation keys on the GUI displayed on the display 109 are referred to as "soft keys."

The microprocessor 110 is powered from a battery 120 or an alternating current power source via a power supply 121. The microprocessor 110 controls a variety of processes of the imaging apparatus 100. The microprocessor 110 controls a power control signal as necessary and performs power supply control on other elements. The microprocessor 110 analog-to-digital converts an input signal from a hard key on the key input unit 106 or an input signal from a soft key on the GUI on the display 109, determines from a resulting converted digital value a selected key and performs a variety of processes in response to the determination results. The microprocessor 110 includes a central processing unit (CPU) 111, a random-access memory (RAM) 112 and a read-only memory (ROM) 113 and performs the processes in accordance with pre-stored programs.

Upon receiving a play command responsive to a hard key on the key input unit 106 or a soft key on the GUI displayed on the display 109, the microprocessor 110 switches the imaging apparatus 100 to a video signal play mode. The microprocessor 110 reads data recorded on the recording medium 105 via the recording and playing section 104, performs a decoding process on the read data and displays the decoded data onto the display 109 via an overlay processor 108.

An on-screen display (OSD) processor 107 interprets a command input from the microprocessor 110 and transfers a display signal generated on a video RAM (VRAM) to the overlay processor 108 by scan unit. For example, the on-screen display processor 107 generates data, which is to be overlaid on GUI information and manual information, different from a video signal, and transfers the generated data to the overlay processor 108. The overlay processor 108 overlays the display signal from the on-screen display processor 107 on one of a recording video signal or a played video signal and outputs the resulting signals to the display 109.

The microprocessor 110 in the imaging apparatus 100 generates a thumbnail image list of image data recorded on the recording medium 105 in accordance with a user instruction and displays the thumbnail image list on the display 109. In this case, the microprocessor 110 generates a plurality of thumbnail images for images at predetermined time intervals of each scene stored on the recording medium 105 and presents the generated thumbnail images. The microprocessor 110 enters thumbnail image selection information of a user on the displayed time-series thumbnail images and plays the images from an image position corresponding to the thumbnail image selected by the user. These process steps are controlled by the microprocessor 110. The scene refers to image data from the start of the capturing of a moving image to the end of the capturing of the moving image. A plurality of pieces image data corresponding to a variety of scenes are stored on the recording medium 105. The image data changes in time length from scene to scene. One scene may be several seconds long and another scene may be one hour long or even longer.

The microprocessor 110 in the imaging apparatus 100 generates a list of time-series thumbnail images at predetermined time intervals of a scene recorded on the recording medium 105 and displays the generated time-series thumbnail image list on the display 109. Display data of a time-series thumbnail image list corresponding to one scene as moving image recording data unit is referred to as "film roll index screen." An example of film roll index screen on the display 109 and switching of display data on the display 109 are described below with reference to FIG. 2.

Figure 2:
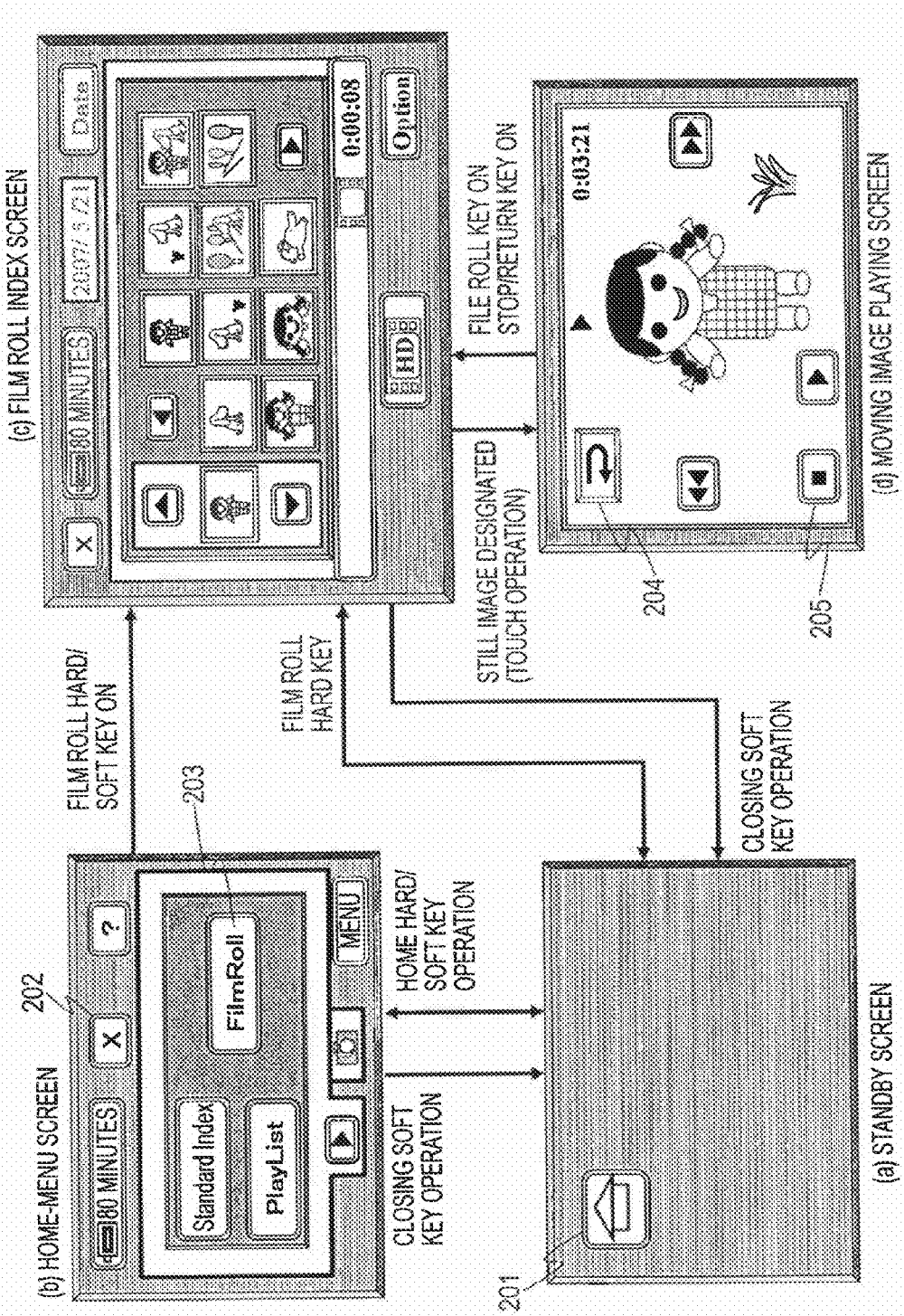
FIG. 2 illustrates a switching operation of screens presented on a display unit.

The display 109 in the imaging apparatus 100 displays four types of screens, namely, standby screen (a), home-menu screen (b), film roll screen (c) and moving image playing screen (d) as shown in FIG. 2.

The microprocessor 110 receives and determines key operation information on the key input unit 106 (hard keys) on the imaging apparatus 100 or key operation information on the GUI containing a variety of keys displayed on the display 109 (soft keys) and switches screens.

In FIG. 2, the film roll screen (c) is the image list data of the time-series thumbnail image list of one scene as moving image recording data unit. As previously discussed, the film roll index screen (c) of the image list data of the thumbnail (contracted) images of the images selected at predetermined time intervals from the one scene of the moving image recording data unit.

The microprocessor 110 generates the thumbnail image to be displayed on the film roll index screen when a request to display the film roll screen (c) has been issued. The thumbnail image is temporarily stored on the RAM 112 in the microprocessor 110 while being output to the display 109 to be displayed. The thumbnail image used on the film roll screen (c) is not recorded on the recording medium 105. The capacity of the recording medium 105 is not used to store the thumbnail image. The microprocessor 110 retrieves the compressed image (a high-definition (HD) video compressed in accordance with moving picture experts group (MPEG)-4 AVC/H.264 or a standard definition (SD) video compressed in accordance with MPEG-2), extracts an intra-frame compression encoded image (also referred to as I-picture, I-frame or I-VOP), contracts the intra-frame compression encoded image and arranges the contracted images in a film roll index list area in an order. The generation method of the thumbnail image displayed on the film roll screen (c) will be described later.

The standby screen (a), the home-menu screen (b), the film roll screen (c) and the moving image playing screen (d) displayed on the display 109 of FIG. 2 and a switching operation of the screens are described below.

The switching operation between the standby screen (a) and the home-menu screen (b) is performed by selecting one of a home soft key 201 displayed on the standby screen (a) and a home hard key arranged on the imaging apparatus 100.

The switching operation from the home-menu screen (b) to the standby screen (a) is performed by selecting a closing soft key 202 on the home-menu screen (b).

The switching operation from the standby screen (a) to the film roll screen (c) is performed by selecting a film roll hard key arranged on the imaging apparatus 100.

The switching operation from the home-menu screen (b) to the film roll screen (c) is performed by selecting one of the film roll hard key arranged on the imaging apparatus 100 and a film roll soft key 203 on the home-menu screen (b).

The screen switching to the film roll screen (c) may be performed directly from the standby screen (a) to the film roll screen (c) or from the standby screen (a) to the home-menu screen (b) and then to the film roll screen (c).

The thumbnail images selected at the predetermined intervals from one scene as one moving recording data unit are displayed on the film roll index screen (c). When one of the thumbnail images is designated by the user, the microprocessor 110 starts playing the images from the designated thumbnail image as a play start position. The moving image played is thus displayed on the moving image playing screen (d). The microprocessor 110 of FIG. 1 stores on a memory (RAM 112) time information of the scene containing the thumbnail images displayed on the film roll screen (c) with each thumbnail image in association with time. More specifically, the time information includes position information of each thumbnail image in the scene containing the intra-frame compression encoded image, elapsed time information of each thumbnail image from the scene head and address information.

When the user designates a thumbnail image by touching the thumbnail image displayed on the film roll screen (c), the microprocessor 110 identifies the touched thumbnail image based on coordinates data at the designated position. The microprocessor 110 acquires the position information (time information) of the thumbnail image in the scene from attribute data for the designated thumbnail image and starts playing the moving image with that position.

The switching operation from the moving image playing screen (d) to the film roll screen (c) is performed by selecting one of a return key 204 and a stop key 205 displayed on the moving image playing screen (d) or the film roll hard key on the imaging apparatus 100.

Figure 3:
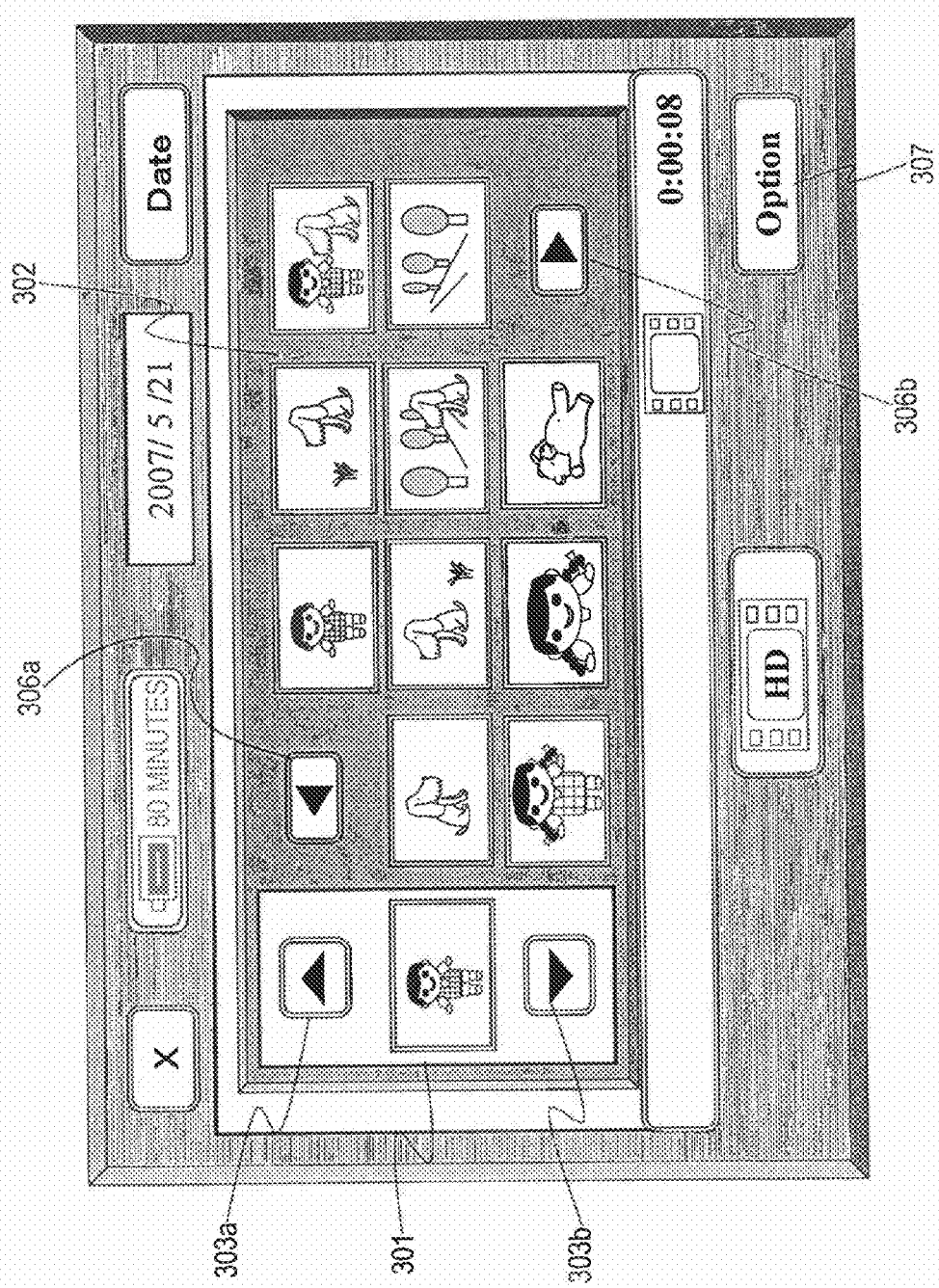
FIG. 3 illustrates a film roll index screen displayed on the display unit.

The film roll screen (c) is described in detail with reference to FIG. 3. The film roll screen (c) includes a scene index display area 301 and an in-scene film roll index display area 302.

The scene index display area 301 displays a representative image selected from one scene as moving image recording data unit. The user can switch representative images by operating a scene index rewind key 303a and a scene forward key 303b. The representative image displayed on the scene index display area 301 is a thumbnail image at the scene head, for example.

The in-scene film roll index display area 302 displays a list of the thumbnail (contracted) images of the images selected at the predetermined intervals from the scene (moving image data) to which the thumbnail image displayed on the scene index display area 301 belongs.

The in-scene film roll index display area 302 displays in-scene film roll index rewind/forward keys 306a and 306b. The user can switch thumbnail images, as film roll indexes, different in time but in the same scene by selecting one of the in-scene film roll index rewind/forward keys 306a and 306b.

By selecting the scene index rewind/forward keys 303a and 303b on the scene index display area 301, the film roll indexes displayed on the in-scene film roll index display area 302 are also switched in response to the scene index displayed on the in-scene film roll index display area 302.

A generation process of the thumbnail image displayed on the film roll screen (c) is described in detail below with reference to FIG. 4. As previously described, the microprocessor 110 generates the thumbnail image to be displayed on the film roll screen (c) in response to a display request to display the film roll screen (c), and stores temporarily the thumbnail image on the RAM 112 while outputting the generated thumbnail image to the display 109 at the same time.

The microprocessor 110 retrieves the compressed image (a high-definition (HD) video compressed in accordance with moving picture experts group (MPEG)-4 AVC/H. 264 or a standard definition (SD) video compressed in accordance with MPEG-2), extracts an intra-frame compression encoded image, contracts the intra-frame compression encoded image and arranges the contracted images in a film roll index list area in an time-series order.

Figure 4:
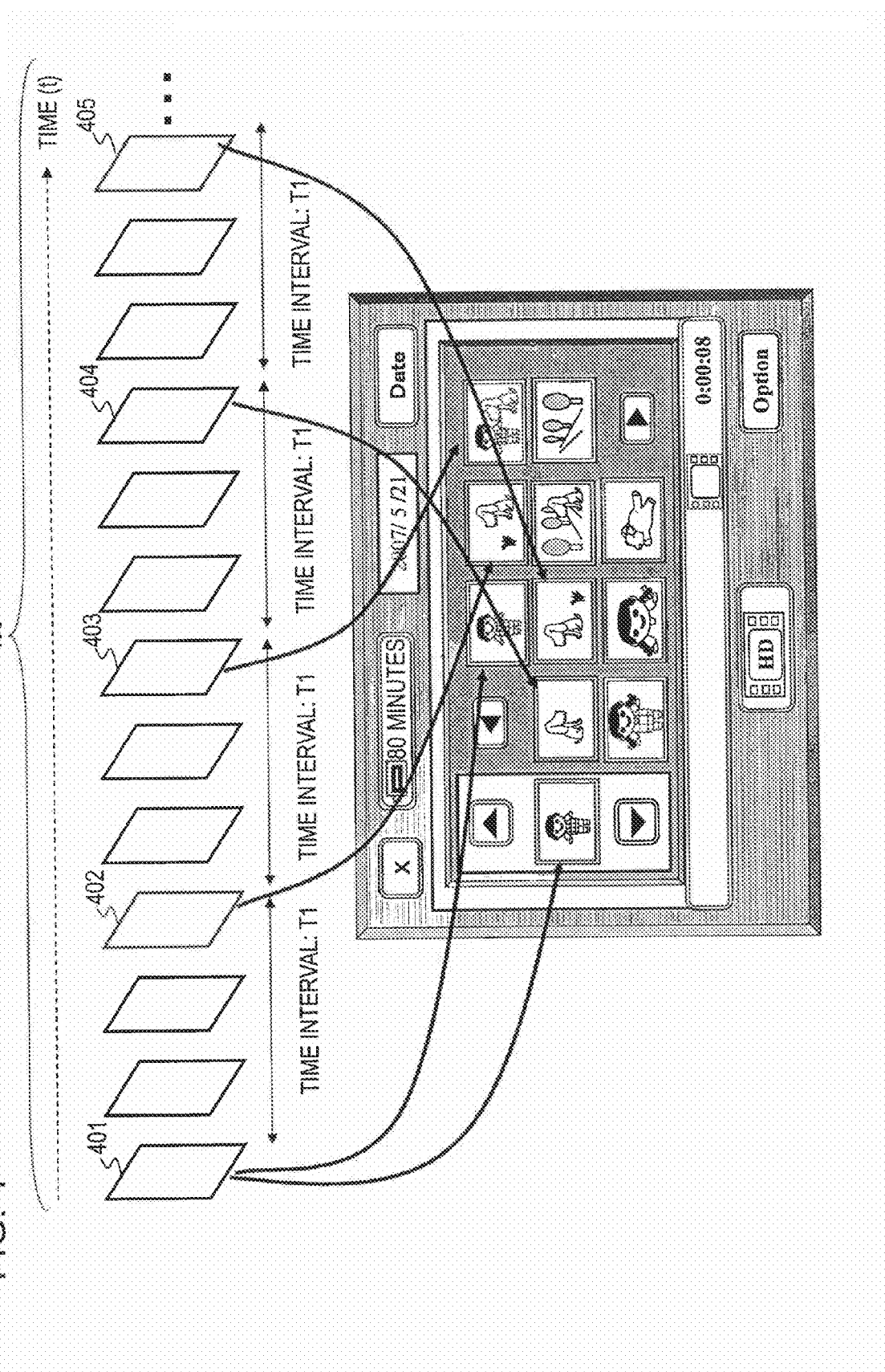
FIG. 4 illustrates a generation process of a thumbnail image displayed on the film roll index screen.

For example, MPEG data 400 forming the scene of FIG. 4 may be available. The MPEG data 400 contains pictures (frames) compressed in accordance with different formats. To generate the thumbnail image, the intra-frame compression encoded image contained in the MPEG data 400 is selected and used. More specifically, the imaging apparatus 100 acquires the intra-frame compression encoded images, contained in the scene designated by the user, at predetermined time intervals (T1 as shown in FIG. 4).

As shown in FIG. 4, the microprocessor 110 selects the intra-frame compression encoded images 401-405 at time intervals of T1. The intra-frame compression encoded image is not necessarily present at the node of the time intervals T1. If no intra-frame compression encoded image is present at the node of the time intervals, an intra-frame compression encoded image closest to the time interval node is selected.

The microprocessor 110 contracts the selected intra-frame compression encoded image to generate a thumbnail image, arranges the generated thumbnail images in time-series order and displays the time-series thumbnail images.

The image recorded on the recording medium 105 may be an HD video. The data recorded in such a case is compressed in accordance with MPEG-4 AVC/H. 264, for example, and is a video recorded in accordance with AVCHD (registered trademark) standard. In such a case, video signal management files (a group of management files having extensions ".BDM," ".MPL" and ".CPI" generally managing the recording medium corresponding to VIDEO_TS.IFO files in DVD-Video format) are recorded together. When the video signal is recorded onto the recording medium, it is not a requirement that the data be compressed. The video signal may be recorded in a non-compressed encoding method.

The microprocessor 110 reads the video signal management file, identifies a position of the intra-frame compression encoded image in the video signal in accordance with predetermined time interval information (for example "T1" of FIG. 4), selects the identified intra-frame compression encoded image for a film roll index, decodes the selected intra-frame compression encoded image and generates the thumbnail image based on the decoded data.

The image recorded on the recording medium 105 may be an SD video. The data recoded in such a case is compressed in accordance with MPEG-2. Instead of the video signal management file, management information is embedded beforehand in a data extension area of the video signal stream.

The microprocessor 110 analyzes the management information in the video signal stream. By analyzing the management information in the video signal stream, the microprocessor 110 identifies the intra-frame compression encoded image at the predetermined time intervals (for example, T1 of FIG. 4), selects the identified intra-frame compression encoded image for a film roll index, decodes the selected intra-frame compression encoded image and generates the thumbnail image based on the decoded data.

The microprocessor 110 selects a plurality of intra-frame compression encoded images at the predetermined time intervals from the encoded data stored on the recording medium 105 and generates the thumbnail images displayed on the film roll index screen of FIG. 4. The number of thumbnail images displayed on the film roll index screen at a time is subject to an upper limit. By operating the in-scene film roll index rewind/forward keys 306*a* and 306*b* as shown FIG. 3, the thumbnail image as film roll index at different time but in the same scene is displayed.

As described with reference to the film roll index screen (c) of FIG. 2, the time-series thumbnail image images are selected at the predetermined time intervals from one scene as one moving image recording unit. When the user designates one thumbnail image, the microprocessor 110 starts playing the scene from the designated thumbnail image as a play start position.

As previously discussed, the microprocessor 110 retrieves the position information (the time information relating to the elapsed time from the scene head and address information) of the intra-frame compression encoded image from the vide signal management file if the video signal is an HD video. If the vide signal is a SD video, the microprocessor 110 analyzes the management information in the video signal stream and then acquires the position of the intra-frame compression encoded image. These pieces of information are stored on the RAM 112. The microprocessor 110 immediately determines the position of each thumbnail image from the stored information and plays the image from the designated thumbnail image. When the moving image playing is stopped, the microprocessor 110 returns to the film roll index screen with the stopped scene at the stop position displayed.

The time intervals of the thumbnail images displayed on the film roll index screen may be modified by the user. A film roll index interval setting screen 501 of FIG. 5 is displayed by operating an option key 307 (see FIG. 3) displayed on the film roll index screen.

Figure 5:
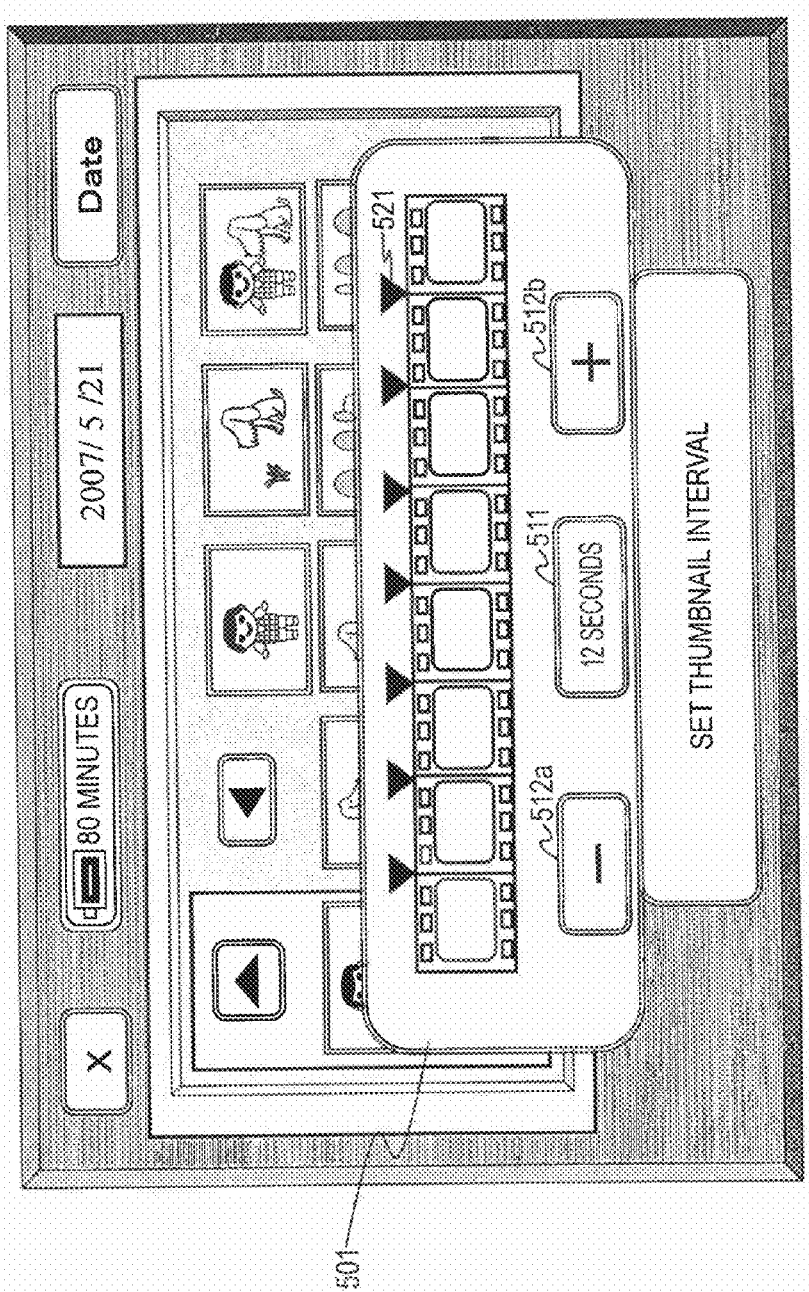
FIG. 5 illustrates a screen for setting time intervals of the thumbnail images displayed on the film roll index screen.

The user operates the film roll index interval setting screen 501 of FIG. 5 to modify the time intervals of the thumbnail images to be displayed on the film roll index screen. Film roll index interval information 511 currently set is displayed on the film roll index interval setting screen 501. As shown in FIG. 5, the film roll index interval information 511 currently set is 12 seconds. In other words, a period of 12 seconds corresponds to time interval T1 of FIG. 4.

The film roll index interval setting screen 501 of FIG. 5 includes interval decreasing and increasing controls 512*a* and 512*b* for decreasing and increasing the time intervals of the film roll indexes, respectively. By operating the controls 512*a* and 512*b*, the user can modify the film roll index interval. The film roll index interval setting screen 501 also shows a marker 521 indicating the film roll index interval on a film graphic image. As shown in FIG. 5, the marker 521 shows the marker interval corresponding to a film roll index interval of 12 seconds.

Figure 6:
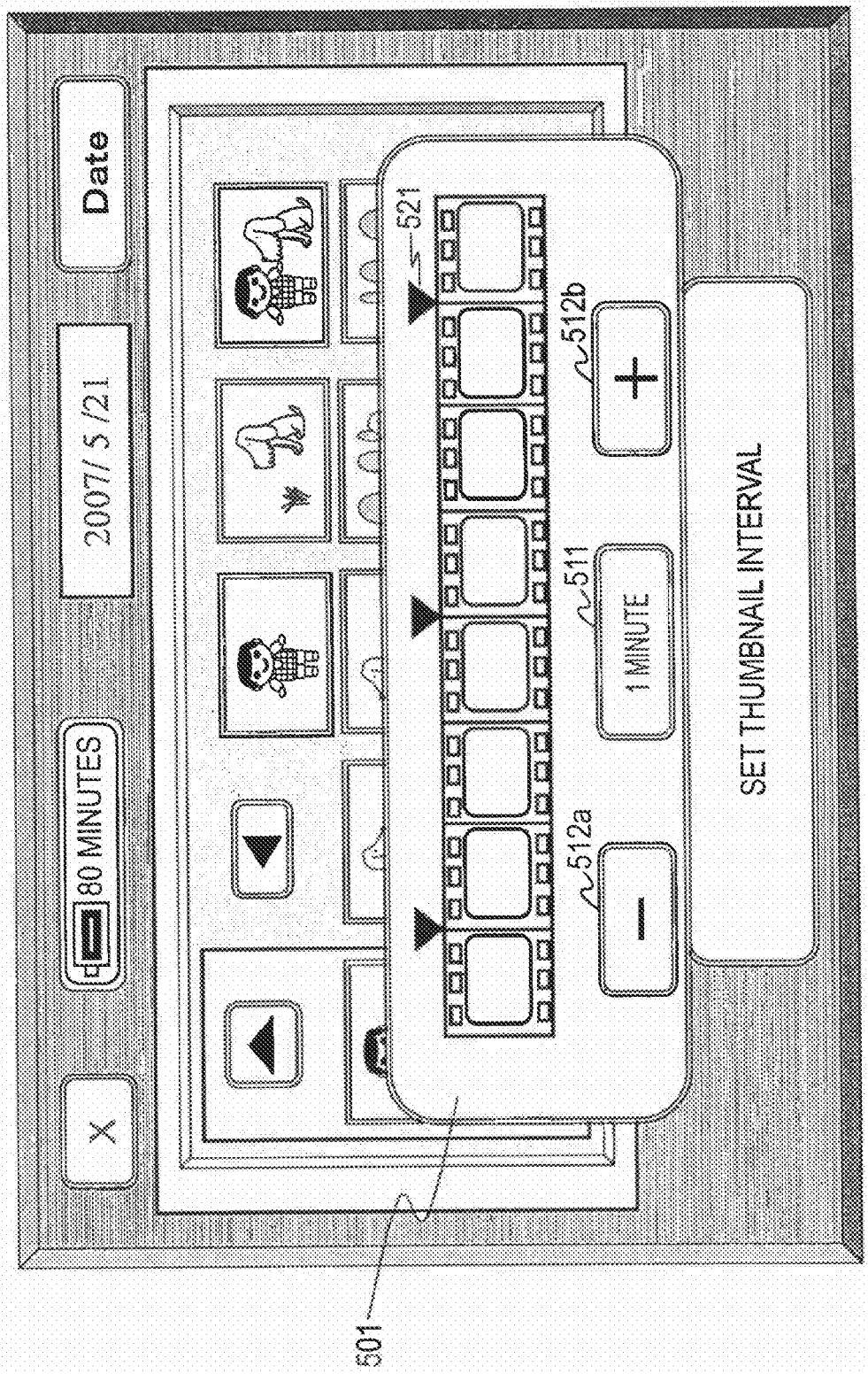
FIG. 6 illustrates a screen for setting time intervals of the thumbnail images displayed on the film roll index screen.

Using the interval decreasing and increasing controls 512*a* and 512*b*, the film roll index interval is modified and the setting intervals of the markers 521 are modified accordingly. FIG. 6 illustrates the film roll index intervals, each set to 1 minute using the interval decreasing and increasing controls 512*a* and 512*b*. The markers 521 displayed on the graphic film image representing the film roll index intervals are spaced wider and the user may easily learn the film roll index intervals.

For example, the film roll index interval may be one of "3 seconds," "6 seconds," "12 seconds," "1 minute" and "5 minutes". Alternatively, the film roll index intervals may be more finely set.

Figure 7:
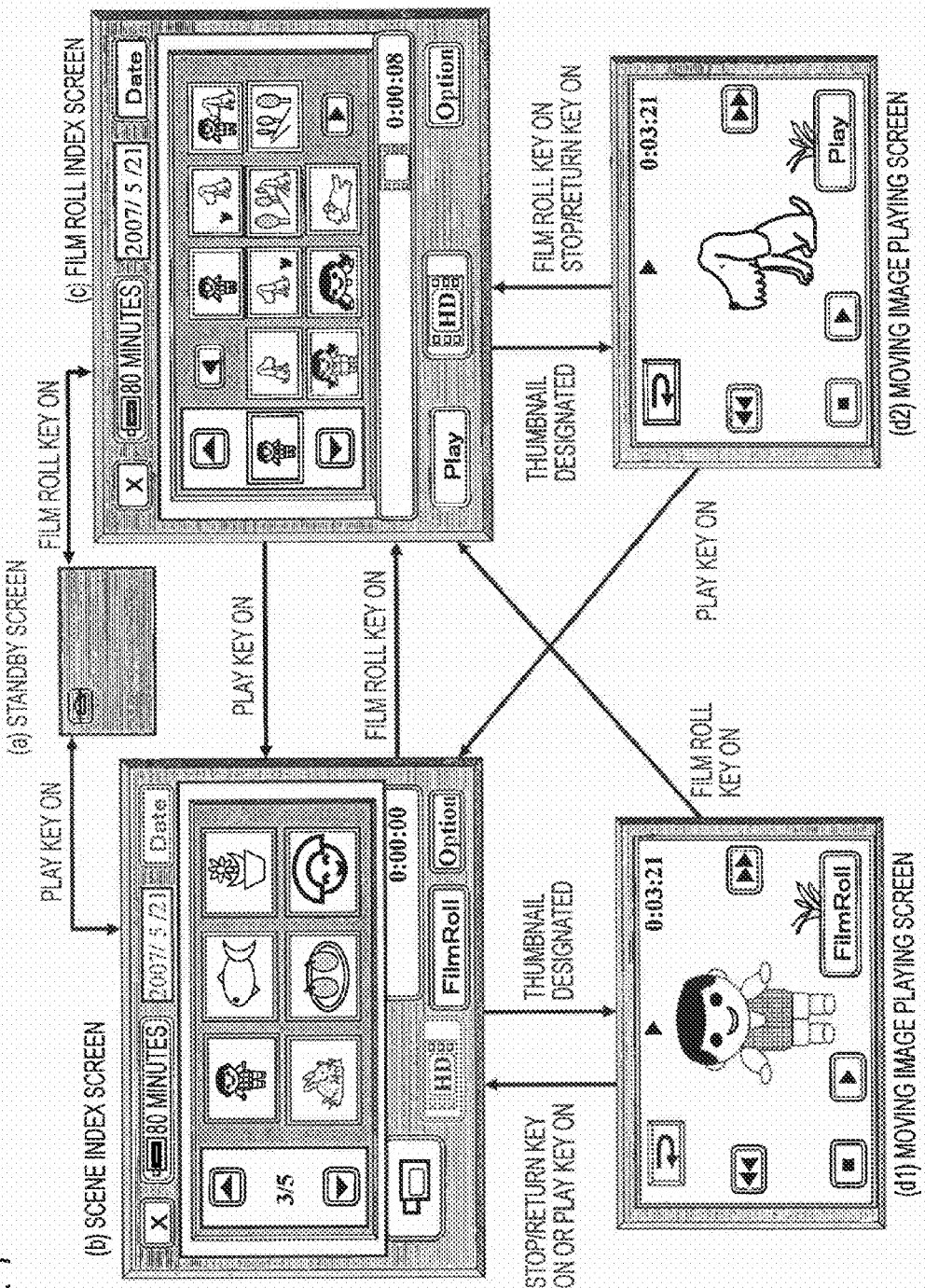
FIG. 7 illustrates a switching operation of screens displayed on the display.

With reference to FIG. 7, a switching operation between the film roll index screen and the standard scene index screen is described below. In this case, the switching operation is triggered by a single user action.

FIG. 7 illustrates five types of screens displayed on the display 109 in the imaging apparatus 100: standby screen (a), scene index screen (b), film roll index screen (c) and moving image playing screen (d1) and moving image playing screen (d2).

The standby screen (a), the film roll index screen (c) and the moving image playing screens (d1 and d2) remain unchanged from those previously described with reference to FIG. 2. Displayed on the scene index screen (b) is a list of thumbnail images that are generated by selecting one representative image (for example, a scene head image) from a plurality of scenes recorded on the recording image. The scene index screen (b) is frequently used in the related art.

The screen switching operation of FIG. 7 between the scene index screen (b) and the film roll index screen (c) is performed by a single user action. The microprocessor 110 receives key operation information from the key input unit 106 on the imaging apparatus 100 or key operation information from a soft key on the GUI including a variety of operation keys displayed on the display 109. In response, the microprocessor 110 determines the key operation and shifts to each of the screens.

The switching operation between the standby screen (a) and the scene index screen (b) is performed by selecting one of a play hard key arranged on the imaging apparatus 100 and play soft key displayed on each screen.

The switching operation between the standby screen (a) and the film roll index screen (c) is performed by selecting one of a film roll hard key arranged on the imaging apparatus 100 and a film roll soft key displayed on each screen.

The switching operation from the scene index screen (b) to the moving image playing screen (d1) is performed by designating a thumbnail image corresponding to the scene index displayed on the scene index screen (b).

The switching operation from the moving image playing screen (d1) to the scene index screen (b) is performed by selecting a stop hard key or a play hard key arranged on the imaging apparatus 100 or a stop/return soft key displayed on the moving image playing screen (d1).

The switching operation from the film roll index screen (c) to the moving image playing screen (d2) is performed by designating a thumbnail image corresponding to the film roll index displayed on the film roll index screen (c).

The switching operation from the moving image playing screen (d2) to the film roll index screen (c) is performed by selecting the film roll hard key or stop key arranged on the imaging apparatus 100 or a stop/return soft key displayed on the moving image playing screen (d2).

The switching operation from the scene index screen (b) to the film roll index screen (c) is performed by selecting the film roll hard key arranged on the imaging apparatus 100 or the film roll soft key displayed on the scene index screen (b).

The switching operation from the film roll index screen (c) to the scene index screen (b) is performed by selecting the play hard key arranged on the imaging apparatus 100 or the play soft key displayed on the film roll index screen (c).

To shift to the film roll index screen (c) after the switching operation from the scene index screen (b) to the moving image playing screen (d1), the film roll hard key on the imaging apparatus 100 or the film roll soft key displayed on the moving image playing screen (d1) is selected.

To shift to the scene index screen (b) after the switching operation from the film roll index screen (c) to the moving image playing screen (d2), the play hard key arranged on the imaging apparatus 100 or the play soft key displayed on the moving image playing screen (d2) is selected.

As shown in FIG. 7, the switching operation between the scene index screen (b) and the film roll index screen (c) is performed by a single user action. Furthermore, the switching operation from each moving image playing screen to one of the scene index screen (b) and the film roll index screen (c) is also performed by a single user action.

For example, the film roll index screen (c) is entered after selecting on the scene index screen (b) a scene desired to be played, and an area within the scene may be immediately selected for playing. The imaging apparatus 100 can thus perform efficiently a variety of processes in a manner that satisfies the user's desired modes of operation.

Any recording medium is used for recording and playing as long as the recording medium provides high random-access performance. A variety of recording media may be used. For example, a hard disk, a semiconductor memory card and an optical disk such as a DVD-R (recordable)/RW (rewritable) may be used for the recording medium. When a DVD-R/RW is used, a video signal management file is set and recorded even in the SD recording. To select data based on setting time interval information of the film roll index indexes, the video signal management file can be used. More specifically, the position of the in-screen compression encoded image in the video signal is identified based on the record information of the video signal management file and the in-screen compression encoded image is decoded.

A display process of the film roll index screen performed by the microprocessor 110 is described below with reference to a flowchart of FIG. 8. In step S101, data related to a user designated scene is retrieved from the recording medium. A variety of methods is possible in the user scene designation process. For example, as shown in FIG. 7, one scene can be selected from the scene index screen (b). In the switching operation of FIG. 2, a scene played last by the user is selected if the film roll key 203 is selected on the home-menu screen. If a scene index is displayed on the scene index display area on the scene index screen discussed with reference to FIG. 3, the scene corresponding to the displayed index becomes a user designated scene.

The microprocessor 110 retrieves, from the recording medium, data corresponding to the scene designated in one of the above methods. In step S102, the microprocessor 110 retrieves data (in-screen compression encoded image) at each predetermined film roll index interval (T1) based on the management information embedded in the data. This process has been described with reference to FIG. 4.

If the HD video is processed, the microprocessor 110 retrieves the position information (time elapse information from the head of the scene) of the in-screen compression encoded image from the vide signal management file. If the SD video is processed, the microprocessor 110 acquires the position information of the in-screen compression encoded image by analyzing the management information in the video signal stream. The microprocessor 110 retrieves the data (in-screen compression encoded image) at each predetermined film roll index interval (T1). As previously described with reference to FIGS. 5 and 6, the film roll index interval can be modified by the user.

In step S103, the microprocessor 110 decodes the retrieved data (in-screen compression encoded image), generates the thumbnail image, arranges the thumbnail images generated in step S104, and displays the arranged thumbnail images in a time-series order. The film roll index screen of FIG. 3 is thus displayed.

The present invention has been described with reference to the particular embodiments. It is obvious to any person of ordinary skill in the art that modifications and changes are possible without departing from the scope of the present invention. The embodiments of the present invention have been discussed for exemplary purposes only and are not intended to limit the present invention. The scope of the invention is determined solely by reference to the claims appended hereto.

The series of process steps described above may be performed using hardware, software or a combination of both. If the process steps are performed using software, a program recording a process sequence of the software may be installed onto a memory in a computer in dedicated hardware or may be installed onto a general-purpose computer that performs a variety of processes. The program may be pre-recorded on the recording medium. The program may be installed from the recording medium. Alternatively, the program may be received via a network such as a local area network (LAN) and installed onto a recording medium such as a hard disk in the computer.

The process steps may be performed in a time-series order as described above. Alternatively, the process steps may be performed in parallel or separately as necessary or depending on a throughput of the apparatus performing each process. In this specification, the term system refers to a logical set of a plurality of apparatuses and elements of each apparatus are not necessarily housed in a single casing.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus configured to process an image, comprising:
    an input unit configured to input user operation information;
    a data processor configured to retrieve data recorded on the recording medium and generate display data in response to an input to the input unit,
    the data processor generating a contracted image of an image selected at predetermined time intervals from a scene as a moving image recording unit recorded on the recording medium and displaying on the display unit a list of generated contracted images arranged in a time-series order,
    wherein the data processor inputs contracted image designation information from a user designating a single contracted image on the time-series contracted image list displayed on the display unit and plays the scene from an image position corresponding to the designated contracted image.

2. The apparatus according to claim 1, wherein the data processor selects, as source data of the contracted image to be displayed on the time-series contracted image list, an intra-frame encoded image present in the vicinity of a node of the predetermined time intervals and generates the contracted image.

3. The apparatus according to claim 2, wherein the data processor acquires position information of an intra-frame encoded image within the scene from a video signal management file recorded on the recording medium, selects the intra-frame encoded image present in the vicinity of a node of the predetermined time intervals and generates the contracted image.

4. The apparatus according to claim 2, wherein the data processor acquires position information of an intra-frame encoded image by analyzing management information in a video signal stream of the scene recorded on the recording medium, selects the intra-frame encoded image present in the vicinity of a node of the predetermined time intervals and generates the contracted image.

5. The apparatus according to claim 1, wherein the data processor switches between a time-series contracted image list screen displayed on the display unit and a scene index screen, displayed on the display unit, containing the contracted image as a representative image of each of a plurality of scenes stored on the recording medium, in response to user operation information entered via the input unit.

6. The apparatus according to claim 1, wherein the data processor switches between a time-series contracted image list screen displayed on the display unit and a scene index screen, displayed on the display unit, containing the contracted image as a representative image of each of a plurality of scenes stored on the recording medium, in response to single-action user operation information entered via the input unit.

7. An apparatus for processing an image, comprising:
    an input unit for inputting user operation information;
    a recording medium for recording moving image data;
    a data processor for retrieving data recorded on the recording medium and generating display data in response to an input to the input unit; and
    a display unit for displaying the display data generated and output by the data processor,
    the data processor generating a contracted image of an image selected at predetermined time intervals from a scene as a moving image recording unit recorded on the recording medium and displaying on the display unit a list of generated contracted images arranged in a time-series order,
    wherein the data processor selects, as source data of the contracted image to be displayed on the time-series contracted image list, an intra-frame encoded image present in the vicinity of a node of the predetermined time intervals and generates the contracted image,
    wherein the data processor inputs contracted image designation information from a user designating a single contracted image on the time-series contracted image list displayed on the display unit and plays the scene from an image position corresponding to the designated contracted image.

8. The apparatus according to claim 7, wherein the data processor acquires position information of an intra-frame encoded image within the scene from a video signal management file recorded on the recording medium, selects the intra-frame encoded image present in the vicinity of a node of the predetermined time intervals and generates the contracted image.

9. The apparatus according to claim 7, wherein the data processor acquires position information of an intra-frame encoded image by analyzing management information in a video signal stream of the scene recorded on the recording medium, selects the intra-frame encoded image present in the vicinity of a node of the predetermined time intervals and generates the contracted image.

10. An apparatus for processing an image, comprising:
    an input unit for inputting user operation information;
    a recording medium for recording moving image data;
    a data processor for retrieving data recorded on the recording medium and generating display data in response to an input to the input unit; and
    a display unit for displaying the display data generated and output by the data processor,
    the data processor generating a contracted image of an image selected at predetermined time intervals from a scene as a moving image recording unit recorded on the recording medium and displaying on the display unit a list of generated contracted images arranged in a time-series order,
    wherein the input unit includes a touchpanel on the display unit, and
    wherein the data processor inputs contracted image designation information from a user designating a single contracted image on the time-series contracted image list displayed on the display unit and plays the image from an image position corresponding to the designated contracted image.

11. An apparatus for processing an image, comprising:
    an input unit for inputting user operation information;
    a recording medium for recording moving image data;
    a data processor for retrieving data recorded on the recording medium and generating display data in response to an input to the input unit; and
    a display unit for displaying the display data generated and output by the data processor, the data processor generating a contracted image of an image selected at predetermined time intervals from a scene as a moving image recording unit recorded on the recording medium and displaying on the display unit a list of generated contracted images arranged in a time-series order, wherein the data processor switches between a time-series contracted image list screen displayed on the display unit and a scene index screen, displayed on the display unit, containing the contracted image as a representative image of each of a plurality of scenes stored on the recording medium, in response to user operation information entered via the input unit, wherein the data processor inputs contracted image designation information from a user designating a single contracted image on the time-series contracted image list displayed on the display unit and plays the scene from an image position corresponding to the designated contracted image.

12. An apparatus for processing an image, comprising:
an input unit for inputting user operation information;
a recording medium for recording moving image data;
a data processor for retrieving data recorded on the recording medium and generating display data in response to an input to the input unit; and
a display unit for displaying the display data generated and output by the data processor,
the data processor generating a contracted image of an image selected at predetermined time intervals from a scene as a moving image recording unit recorded on the recording medium and displaying on the display unit a list of generated contracted images arranged in a time-series order,
wherein the data processor switches between a time-series contracted image list screen displayed on the display unit and a scene index screen, displayed on the display unit, containing the contracted image as a representative image of each of a plurality of scenes stored on the recording medium, in response to single-action user operation information entered via the input unit,
wherein the data processor inputs contracted image designation information from a user designating a single contracted image on the time-series contracted image list displayed on the display unit and plays the scene from an image position corresponding to the designated contracted image.

13. An imaging apparatus, comprising:
an imaging unit configured to pick up an image;
an input unit configured to input user operation information;
a data processor configured to retrieve data recorded on the recording medium and generate display data in response to an input to the input unit; and
the data processor generating a contracted image of an image selected at predetermined time intervals from a scene as a moving image recording unit recorded on the recording medium and displaying on the display unit a list of generated contracted images arranged in a time-series order,
wherein the data processor inputs contracted image designation information from a user designating a single contracted image on the time-series contracted image list displayed on the display unit and plays the scene from an image position corresponding to the designated contracted image.

14. A method of an image processing apparatus for controlling image displaying, comprising steps of:
processing data by retrieving data recorded on a recording medium and generating display data in response to an input to the input unit; and
the step of processing data including generating a contracted image of an image selected at predetermined time intervals from a scene as a moving image recording unit recorded on the recording medium and displaying on the display unit a list of generated contracted images arranged in a time-series order, and
inputting contracted image designation information from a user designating a single contracted image on the time-series contracted image list displayed on the display unit and playing the scene from an image position corresponding to the designated contracted image.

15. A method of an image processing apparatus for controlling image displaying, comprising steps of:
inputting user operation information to an input unit;
processing data by retrieving data recorded on a recording medium and generating display data in response to an input to the input unit; and
displaying the generated display data on a display unit,
the step of processing data including generating a contracted image of an image selected at predetermined time intervals from a scene as a moving image recording unit recorded on the recording medium and displaying on the display unit a list of generated contracted images arranged in a time-series order,
wherein the step of processing data includes selecting, as source data of the contracted image to be displayed on the time-series contracted image list, an intra-frame encoded image present in the vicinity of a node of the predetermined time intervals and generating the contracted image, and
inputting contracted image designation information from a user designating a single contracted image on the time-series contracted image list displayed on the display unit and plays the scene from an image position corresponding to the designated contracted image.

16. The method according to claim 15, wherein the step of processing data includes acquiring position information of an intra-frame encoded image within the scene from a video signal management file recorded on the recording medium, selects the intra-frame encoded image present in the vicinity of a node of the predetermined time intervals and generating the contracted image.

17. The method according to claim 15, wherein the step of processing data includes acquiring position information of an intra-frame encoded image by analyzing management information in a video signal stream of the scene recorded on the recording medium, selects the intra-frame encoded image present in the vicinity of a node of the predetermined time intervals and generating the contracted image.

18. A method of an image processing apparatus for controlling image displaying, comprising steps of:
inputting user operation information to an input unit;
processing data by retrieving data recorded on a recording medium and generating display data in response to an input to the input unit; and
displaying the generated display data on a display unit,
the step of processing data including generating a contracted image of an image selected at predetermined time intervals from a scene as a moving image recording unit recorded on the recording medium and displaying on the display unit a list of generated contracted images arranged in a time-series order, wherein the input unit includes a touchpanel on the display unit, and wherein the step of processing data includes inputting contracted image designation information from a user designating a single contracted image on the time-series contracted image list displayed on the display unit and playing the image from an image position corresponding to the designated contracted image.

19. A method of an image processing apparatus for controlling image displaying, comprising steps of:

inputting user operation information to an input unit;

processing data by retrieving data recorded on a recording medium and generating display data in response to an input to the input unit; and displaying the generated display data on a display unit, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes switching between a time-series contracted image list screen displayed on the display unit and a scene index screen, displayed on the display unit, containing the contracted image as a representative image of each of a plurality of scenes stored on the recording medium, in response to user operation information entered via the input unit, and inputting contracted image designation information from a user designating a single contracted image on the time-series contracted image list displayed on the display unit and plays the scene from an image position corresponding to the designated contracted image.

20. A method of an image processing apparatus for controlling image displaying, comprising steps of:

inputting user operation information to an input unit;

processing data by retrieving data recorded on a recording medium and generating display data in response to an input to the input unit; and displaying the generated display data on a display unit, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes switching between a time-series contracted image list screen displayed on the display unit and a scene index screen, displayed on the display unit, containing the contracted image as a representative image of each of a plurality of scenes stored on the recording medium, in response to single action user operation information entered via the input unit, and inputting contracted image designation information from a user designating a single contracted image on the time-series contracted image list displayed on the display unit and plays the scene from an image position corresponding to the designated contracted image.

21. A non-transitory computer-readable medium storing computer readable instructions thereon for controlling image displaying that when executed by an image processing appa ratus cause the image processing apparatus to perform a method comprising:

processing data by retrieving data recorded on a recording medium and generating display data in response to an input to the input unit, the step of processing data including generating a contracted image of an image selected at predetermined time intervals from a scene as a moving image recording unit recorded on the recording medium and displaying on the display unit a list of generated contracted images arranged in a time-series order, and inputting contracted image designation information from a user designating a single contracted image on the time-series contracted image list displayed on the display unit and plays the scene from an image position corresponding to the designated contracted image.

22. An imaging apparatus, comprising:

an imaging unit for picking up an image;

an input unit for inputting user operation information;

a recording medium for recording moving image data;

a data processor for retrieving data recorded on the recording medium and generating display data in response to an input to the input unit; and a display unit for displaying the display data generated and output by the data processor, the data processor generating a contracted image of an image selected at predetermined time intervals from a scene as a moving image recording unit recorded on the recording medium and displaying on the display unit a list of generated contracted images arranged in a time-series order, wherein the data processor selects, as source data of the contracted image to be displayed on the time-series contracted image list, an intra-frame encoded image present in the vicinity of a node of the predetermined time intervals and generates the contracted image, wherein the data processor inputs contracted image designation information from a user designating a single contracted image on the time-series contracted image list displayed on the display unit and plays the scene from an image position corresponding to the designated contracted image.

23. The apparatus according to claim 22, wherein the data processor acquires position information of an intra-frame encoded image within the scene from a video signal management file recorded on the recording medium, selects the intra-frame encoded image present in the vicinity of a node of the predetermined time intervals and generates the contracted image.

24. The apparatus according to claim 22, wherein the data processor acquires position information of an intra-frame encoded image by analyzing management information in a video signal stream of the scene recorded on the recording medium, selects the intra-frame encoded image present in the vicinity of a node of the predetermined time intervals and generates the contracted image.

25. An imaging apparatus, comprising:

an imaging unit for picking up an image;

an input unit for inputting user operation information;

a recording medium for recording moving image data;

a data processor for retrieving data recorded on the recording medium and generating display data in response to an input to the input unit; and a display unit for displaying the display data generated and output by the data processor, the data processor generating a contracted image of an image selected at predetermined time intervals from a scene as a moving image recording unit recorded on the recording medium and displaying on the display unit a list of generated contracted images arranged in a time-series order, wherein the input unit includes a touchpanel on the display unit, and wherein the data processor inputs contracted image designation information from a user designating a single contracted image on the time-series contracted image list displayed on the display unit and plays the image from an image position corresponding to the designated contracted image.

26. An imaging apparatus, comprising:
an imaging unit for picking up an image;
an input unit for inputting user operation information;
a recording medium for recording moving image data;
a data processor for retrieving data recorded on the recording medium and generating display data in response to an input to the input unit; and
a display unit for displaying the display data generated and output by the data processor,
the data processor generating a contracted image of an image selected at predetermined time intervals from a scene as a moving image recording unit recorded on the recording medium and displaying on the display unit a list of generated contracted images arranged in a time-series order,
wherein the data processor switches between a time-series contracted image list screen displayed on the display unit and a scene index screen, displayed on the display unit, containing the contracted image as a representative image of each of a plurality of scenes stored on the recording medium, in response to user operation information entered via the input unit,
wherein the data processor inputs contracted image designation information from a user designating a single contracted image on the time-series contracted image list displayed on the display unit and plays the scene from an image position corresponding to the designated contracted image.

27. An imaging apparatus, comprising:
an imaging unit for picking up an image;
an input unit for inputting user operation information;
a recording medium for recording moving image data;
a data processor for retrieving data recorded on the recording medium and generating display data in response to an input to the input unit; and
a display unit for displaying the display data generated and output by the data processor,
the data processor generating a contracted image of an image selected at predetermined time intervals from a scene as a moving image recording unit recorded on the recording medium and displaying on the display unit a list of generated contracted images arranged in a time-series order,
wherein the data processor switches between a time-series contracted image list screen displayed on the display unit and a scene index screen, displayed on the display unit, containing the contracted image as a representative image of each of a plurality of scenes stored on the recording medium, in response to single-action user operation information entered via the input unit,
wherein the data processor inputs contracted image designation information from a user designating a single contracted image on the time-series contracted image list displayed on the display unit and plays the scene from an image position corresponding to the designated contracted image.

28. A non-transitory computer-readable medium storing computer readable instructions thereon for controlling image displaying that when executed by an image processing apparatus cause the image processing apparatus to perform a method comprising:
processing data by retrieving data recorded on a recording medium and generating display data in response to an input to the input unit; and
displaying the generated display data,
the step of processing data including generating a contracted image of an image selected at predetermined time intervals from a scene as a moving image recording unit recorded on the recording medium and displaying on the display unit a list of generated contracted images arranged in a time-series order,
wherein the step of processing data includes selecting, as source data of the contracted image to be displayed on the time-series contracted image list, an intra-frame encoded image present in the vicinity of a node of the predetermined time intervals and generating the contracted image,
wherein the data processor inputs contracted image designation information from a user designating a single contracted image on the time-series contracted image list displayed on the display unit and plays the scene from an image position corresponding to the designated contracted image.

29. The non-transitory computer-readable medium according to claim 28, wherein the step of processing data includes acquiring position information of an intra-frame encoded image within the scene from a video signal management file recorded on the recording medium, selects the intra-frame encoded image present in the vicinity of a node of the predetermined time intervals and generating the contracted image.

30. The non-transitory computer-readable medium according to claim 28, wherein the step of processing data includes acquiring position information of an intra-frame encoded image by analyzing management information in a video signal stream of the scene recorded on the recording medium, selects the intra-frame encoded image present in the vicinity of a node of the predetermined time intervals and generating the contracted image.

31. A non-transitory computer-readable medium storing computer readable instructions thereon for controlling image displaying that when executed by an image processing apparatus cause the image processing apparatus to perform a method comprising:
processing data by retrieving data recorded on a recording medium and generating display data in response to an input to the input unit; and
displaying the generated display data,
the step of processing data including generating a contracted image of an image selected at predetermined time intervals from a scene as a moving image recording unit recorded on the recording medium and displaying on the display unit a list of generated contracted images arranged in a time-series order,
wherein the input unit includes a touchpanel on the display unit, and
wherein the step of processing data includes inputting contracted image designation information from a user designating a single contracted image on the time-series contracted image list displayed on the display unit and playing the image from an image position corresponding to the designated contracted image.

32. A non-transitory computer-readable medium storing computer readable instructions thereon for controlling image displaying that when executed by an image processing apparatus cause the image processing apparatus to perform a method comprising:

processing data by retrieving data recorded on a recording medium and generating display data in response to an input to the input unit; and displaying the generated display data, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes switching between a time-series contracted image list screen displayed on the display unit and a scene index screen, displayed on the display unit, containing the contracted image as a representative image of each of a plurality of scenes stored on the recording medium, in response to user operation information entered via the input unit, and inputting contracted image designation information from a user designating a single contracted image on the time-series contracted image list displayed on the display unit and playing the scene from an image position corresponding to the designated contracted image.

33. A non-transitory computer-readable medium storing computer readable instructions thereon for controlling image displaying that when executed by an image processing apparatus cause the image processing apparatus to perform a method comprising:

processing data by retrieving data recorded on a recording medium and generating display data in response to an input to the input unit; and displaying the generated display data, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes switching between a time-series contracted image list screen displayed on the display unit and a scene index screen, displayed on the display unit, containing the contracted image as a representative image of each of a plurality of scenes stored on the recording medium, in response to single action user operation information entered via the input unit, and inputting contracted image designation information from a user designating a single contracted image on the time-series contracted image list displayed on the display unit and playing the scene from an image position corresponding to the designated contracted image.

34. An apparatus for processing an image, comprising:

an input unit for inputting user operation information;

a recording medium for recording moving image data;

a data processor for retrieving data recorded on the recording medium and generating display data in response to an input to the input unit; and a display unit for displaying the display data generated and output by the data processor, the data processor generating a contracted image of an image selected at predetermined time intervals from a scene as a moving image recording unit recorded on the recording medium and displaying on the display unit a list of generated contracted images arranged in a time-series order, wherein the data processor inputs contracted image designation information from a user designating a single contracted image on the time-series contracted image list displayed on the display unit and plays the image from an image position corresponding to the designated contracted image.

35. An imaging apparatus, comprising:

an imaging unit for picking up an image;

an input unit for inputting user operation information;

a recording medium for recording moving image data;

a data processor for retrieving data recorded on the recording medium and generating display data in response to an input to the input unit; and a display unit for displaying the display data generated and output by the data processor, the data processor generating a contracted image of an image selected at predetermined time intervals from a scene as a moving image recording unit recorded on the recording medium and displaying on the display unit a list of generated contracted images arranged in a time-series order, wherein the data processor inputs contracted image designation information from a user designating a single contracted image on the time-series contracted image list displayed on the display unit and plays the image from an image position corresponding to the designated contracted image.

36. A method of an image processing apparatus for controlling image displaying, comprising steps of:

inputting user operation information to an input unit;

processing data by retrieving data recorded on a recording medium and generating display data in response to an input to the input unit; and displaying the generated display data on a display unit, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes inputting contracted image designation information from a user designating a single contracted image on the time-series contracted image list displayed on the display unit and playing the image from an image position corresponding to the designated contracted image.

37. A non-transitory computer-readable medium storing computer readable instructions thereon for controlling image displaying that when executed by an image processing apparatus cause the image processing apparatus to perform a method comprising:

processing data by retrieving data recorded on a recording medium and generating display data in response to an input to the input unit; and displaying the generated display data, the step of processing data including generating a contracted image of an image selected at predetermined time intervals from a scene as a moving image recording unit recorded on the recording medium and displaying on the display unit a list of generated contracted images arranged in a time-series order, wherein the step of processing data includes inputting contracted image designation information from a user designating a single contracted image on the time-series contracted image list displayed on the display unit and playing the image from an image position corresponding to the designated contracted image.

* * * * *